United States Patent [19]

Carpenter

[11] Patent Number: 5,076,179
[45] Date of Patent: Dec. 31, 1991

[54] METHOD AND APPARATUS FOR INJECTING SLUDGE INTO A KILN

[75] Inventor: Keith H. Carpenter, Kettering, Ohio

[73] Assignee: Systech Environmental Corp., Xenia, Ohio

[21] Appl. No.: 554,053

[22] Filed: Jul. 13, 1990

[51] Int. Cl.⁵ ............................................. F23D 1/02
[52] U.S. Cl. ................................... 110/264; 110/265
[58] Field of Search ................ 110/261, 264, 265, 106

[56] References Cited

U.S. PATENT DOCUMENTS

| | | |
|---|---|---|
| 3,442,498 | 5/1969 | Davis . |
| 3,523,775 | 8/1970 | Rueckl . |
| 3,589,315 | 6/1971 | Hart ..................................... 110/265 |
| 4,022,629 | 5/1977 | Garrett et al. . |
| 4,022,630 | 5/1977 | Watson et al. . |
| 4,081,285 | 3/1978 | Pennell . |
| 4,407,236 | 10/1983 | Schukei et al. . |
| 4,546,710 | 10/1985 | Cremer .................................. 110/265 |
| 4,630,554 | 12/1986 | Sayler et al. ......................... 110/265 |
| 4,687,436 | 8/1987 | Shigeta .................................. 110/264 |
| 4,724,780 | 2/1988 | Hoffert .................................. 110/265 |
| 4,850,290 | 7/1989 | Benoit et al. . |

FOREIGN PATENT DOCUMENTS

US87/01868  7/1987  PCT Int'l Appl. .

Primary Examiner—Henry C. Yuen
Attorney, Agent, or Firm—Thompson, Hine and Flory

[57] ABSTRACT

A method and apparatus for injecting sludge into a kiln includes a pump for pumping sludge, an attrition segment for attriting the sludge into smaller particles, and a conduit enclosing the attrition segment for entraining the particles in a stream of compressed air to carry the particles into a kiln. In the preferred embodiment, the attrition segment includes a perforated member, preferably comprising a plurality of perforated tubes which project jets of compressed air radially inwardly to slice the sludge mass within the segment into smaller particles. As the particles exit the attrition segment, they become entrained in a stream of compressed air flowing through the air conduit enclosing the attrition segment and are carried into the kiln.

15 Claims, 3 Drawing Sheets

FIG-2

METHOD AND APPARATUS FOR INJECTING SLUDGE INTO A KILN

BACKGROUND OF INVENTION

The present invention relates to apparatus for feeding fuel to a kiln and, more particularly, to a method and apparatus for feeding sludge into a rotary cement kiln.

In response to increasing concern over the disposal of waste material in a manner which does not generate pollution, attempts have been made to burn waste material as a part of a rotary kiln cement-making process. Use of refuse-derived fuel ("RDF"), having a volatile organic content, is desirable in a cement-making process in that the waste is incinerated at relatively elevated temperatures, such as 1,300°–1,600° C., which is sufficient to break down the toxic or hazardous constituents of the waste. Further, the combustion of waste adds heat to the cement-making process and the ash becomes part of the cement clinker.

Since industries and municipalities are willing to pay for the disposal of such waste, the overall cost of cement making is reduced by the income received from accepting waste and from the reduced dependence upon conventional fossil fuels in the cement-making process.

An example of such a process is disclosed in Watson, et al. U.S. Pat. No. 4,022,630. That patent discloses a method of incinerating municipal refuse by burning it in a pulverized condition in a rotary cement kiln by blowing the refuse, in a comminuted state, into a kiln at the same location as the conventional fuel burners. The device requires that the comminuted refuse have a heating value sufficient to enable it to be burned while entrained in an air stream in a manner similar to the burning of conventional fuel.

In order to utilize RDF and, at the same time, produce the highest quality cement clinker, it is necessary to burn the RDF as completely as possible. This requires that the RDF be comminuted into very small particles to increase the collective surface area of the RDF and promote mixing with oxygen. While this is relatively easy to accomplish with standard municipal refuse and liquid refuse, such as oil or cleaning solvents, it becomes difficult with more viscous material, such as sludge.

The Benoit, et al. U.S. Pat. No. 4,850,290 discloses an apparatus for burning sludge in a rotary kiln in which the sludge is injected into the kiln in the form of discrete fuel containers. The kiln body includes a radially-extending tube in which the sludge capsule is placed. As the tube passes the vertical, the sludge capsule is drawn by gravity downwardly into the kiln bed where it is burned. The sludge capsule itself comprises combustible material. A disadvantage with such a device is that the sludge is placed into the kiln in a large mass which does not promote burning of the sludge and also creates a relatively "cool" spot in the burning clinker. Such a cool spot may adversely affect the quality of the clinker produced by the kiln. Also, incomplete burning of the sludge may lead to the generation of carbon monoxide which subsequently is discharged to the atmosphere as an undesirable constituent.

Accordingly, there is a need for a device for burning highly viscous sludge in which the sludge is injected into a cement kiln in a fashion which promotes the rapid and complete burning of the sludge without affecting the quality of the cement clinker produced.

SUMMARY OF INVENTION

The present invention is a method and apparatus for injecting sludge into a kiln which tends to maintain the quality of the cement clinker produced in the kiln and promotes the complete burning of the sludge within the kiln. The apparatus includes a conduit communicating with a rotary kiln for conveying sludge to the kiln, a pump for propelling the sludge along the conduit and an attrition segment adjacent to the kiln for attriting the sludge into relatively small, discrete particles. The attrition segment includes a perforated member extending along the segment which directs a concentrated jet, or a plurality of jets, of compressed air from the perforations to sludge within the segment. The attrition segment is enclosed in a larger conduit for conveying secondary compressed air into the kiln so that the attrited sludge particles are entrained in the air.

In operation, sludge is pumped to the attrition segment where the jets of compressed air from the perforations slice through the sludge like knives to break up the sludge into small particles. The force of the jets of compressed air, combined with the pressure of the sludge flowing to the attrition segment, causes the sludge particles to move forwardly toward the kiln. As the sludge particles leave the attrition segment, they become entrained in the secondary compressed air stream flowing into the kiln and are carried, airborne-fashion, into the kiln for combustion.

In a preferred embodiment of the invention, the perforated member of the attrition segment comprises tubes which are serpentine in shape and spaced about the inner periphery of the segment. The tubes include orifices oriented to direct the jets of air inwardly and forwardly toward a center line of the segment to provide an even arrangement and distribution of the jets of compressed air so that the particles formed by the jets of compressed air are as small as possible, and are urged in a downstream direction. Further, the attrition segment includes a tray which supports the lower ones of the compressed air tubes as well as the portion of the sludge stream within the attrition segment.

Also in the preferred embodiment, the air injection tubes are positioned to extend toward each other along the attrition segment in a direction toward the cement kiln. As a volume of sludge moves through the attrition segment, the sludge outer diameter is reduced by attrition and the converging tubes maintain a close relationship to the sludge volume as it progresses along the segment. The tubes are sufficiently flexible to be deflected slightly radially outwardly as the sludge moves along the attrition segment, in order to maintain the close relationship.

Accordingly, it is an object of the present invention to provide a method and apparatus for injecting highly viscous sludge into a cement kiln through the use of compressed air; a method and apparatus for breaking up large quantities of sludge into finely-divided particles to promote the rapid burning of the particles; a method and apparatus for injecting sludge into a cement kiln which tends to maintain the quality of the cement clinker produced by the kiln; and a method and apparatus for injecting sludge into a kiln which has few moving parts and is relatively wear-resistant.

Other objects and advantages of the present invention will be apparent from the following description, the accompanying drawings and the appended claims.

DETAILED DESCRIPTION

Figure 1:
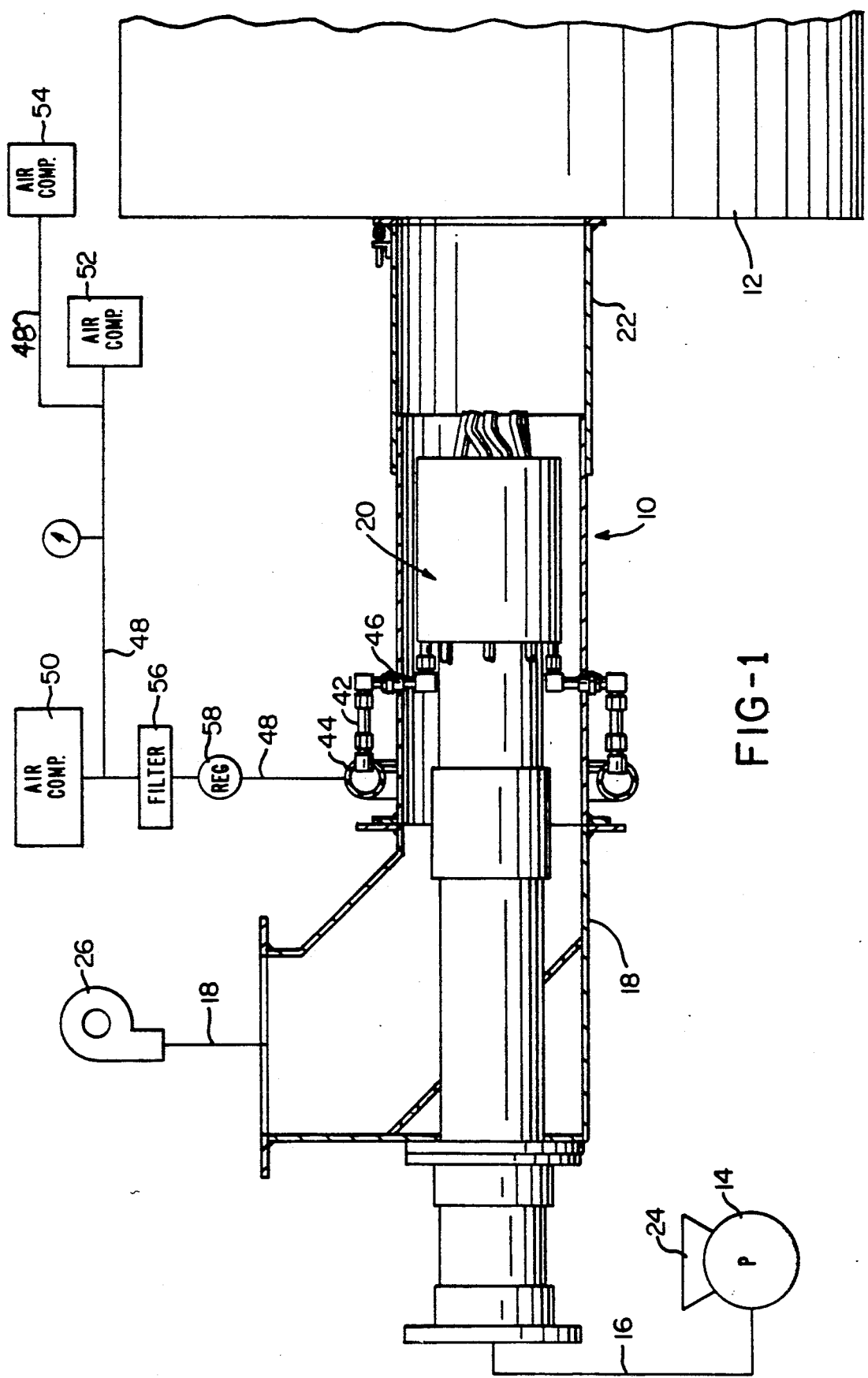
FIG. 1 is a partially schematic, side elevation in section of a preferred embodiment of the present invention.

As shown in FIG. 1, the preferred embodiment of the sludge injection system, generally designated 10, is designed to be attached to the non-rotating hood of a cement kiln, generally designated 12. The system 10 includes a pump 14, sludge conduit 16, air conduit 18 and attrition segment 20. The air conduit 18 is connected to the kiln 12 by a spacer conduit 22. It is within the scope of the invention to provide a spacer conduit, or an air conduit, which projects into the hood of the cement kiln 12. The pump 14 preferably is a piston pump and includes a hopper 24 into which the sludge is dumped from barrels or other receptacles.

A blower 26 supplies combustion air to the air conduit 18 at a relatively lower pressure and high rate of flow, and preferably is driven by a relatively small motor, on the order of 2 horsepower. The conduit 18 completely encloses the portion of the sludge conduit immediately upstream of the attrition segment, as well as the attrition segment.

Figure 2:
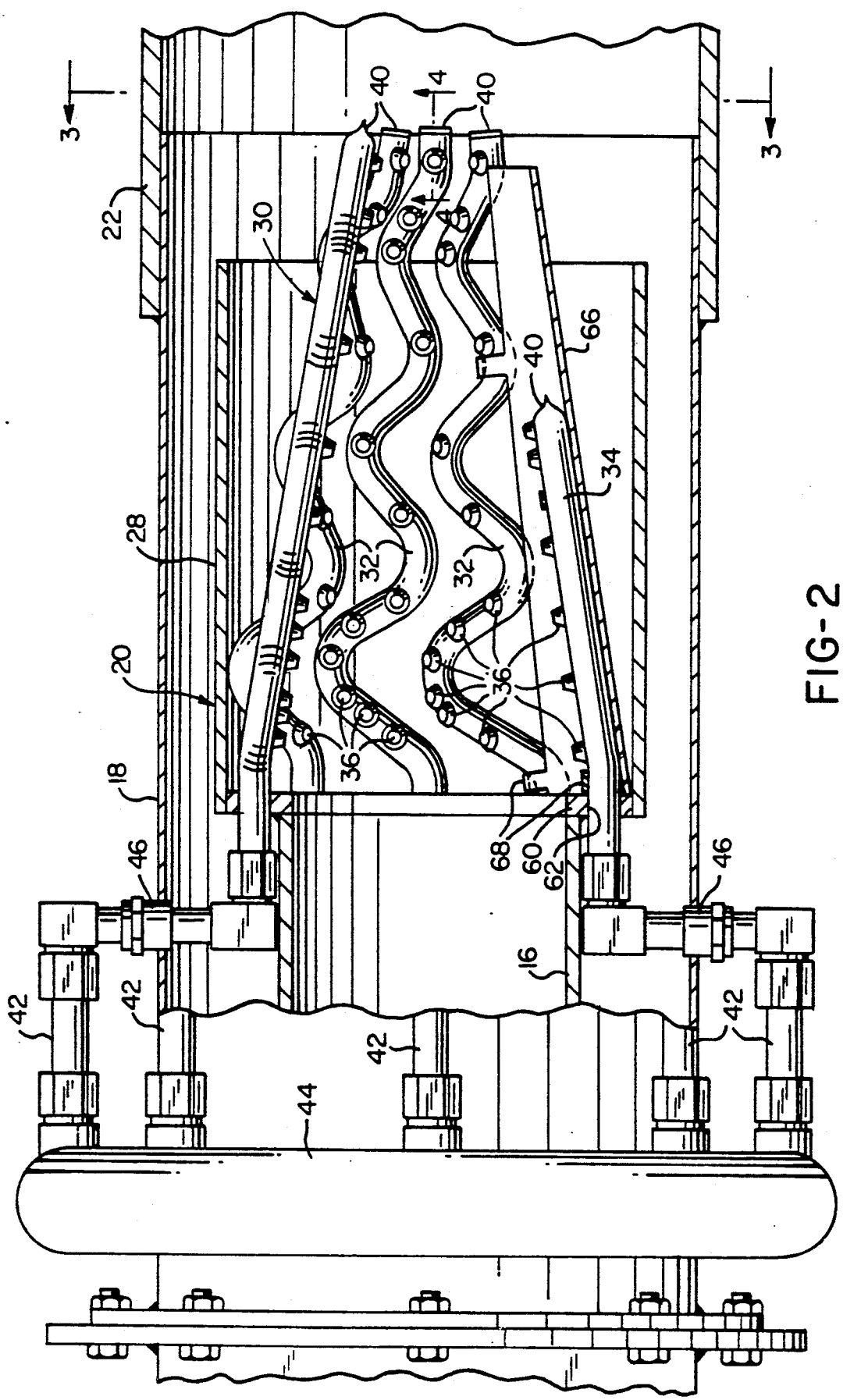
FIG. 2 is a detail of the apparatus of FIG. 1, showing the attrition segment.
Figure 3:
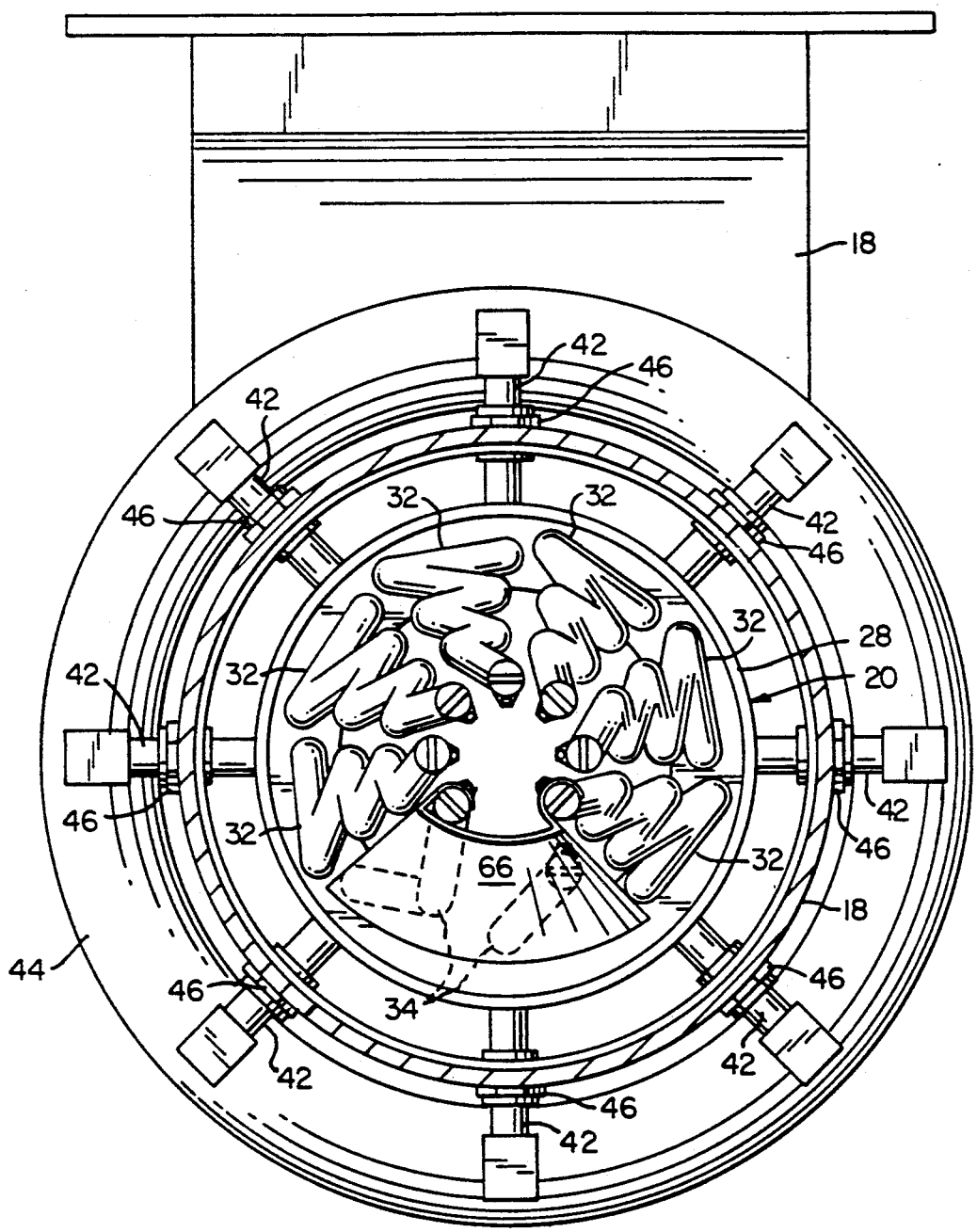
FIG. 3 is an end elevation taken at line 3—3 of FIG. 2.

As shown in. FIGS. 2 and 3, the attrition segment 20 includes a cylindrical, imperforate cowling 28 which encloses a perforated member, generally designated 30. In the preferred embodiment, the perforated member 30 comprises a plurality of tubes disposed about the inner periphery of the cowling 28. The tubes 30 are of two shapes: upper tube elements 32 and lower tube elements 34. As shown best in FIG. 3, upper tube elements 32 are serpentine in shape and are angled to converge at a downstream end of the attrition segment cowling 28. Lower tube elements 34 are curved and, as shown in FIG. 2, are shorter in length than the upper tube elements 32. The tubes 30 each include a plurality of orifices 36, each having a frusto-conical shape and directed inwardly toward the central axis of the attrition segment 20, and angled forwardly toward the kiln 12.

Figure 4:
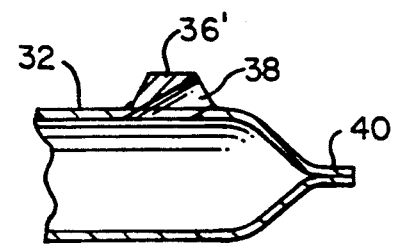
FIG. 4 is a detail side elevation in section taken at line 4—4 of FIG. 2.

As shown in FIG. 4, some of the orifices 36' include forwardly-facing openings 38, and such orifices serve to propel the sludge within the attrition segment 20 in a downstream direction toward the kiln 12 (FIG. 1).

Each of the ends 40 of the tubes 30 are closed and sealed so that the orifices 36 provide the only communication between the interior and exterior of the tubes. The tubes 30 are each connected by a separate conduit 42 to a doughnut-shaped manifold 44. The manifold 44 extends about the outer periphery of air conduit 18 and the conduits 42 each extend through the air conduit at couplings 46.

As shown in FIG. 1, the manifold 44 is supplied with compressed air from a conduit 48, which is connected to high-pressure, low-flow air compressors 50, 52, 54. The compressed air from compressors 50-54 passes through a filter 56 and regulator 58 before reaching the manifold 44. Three compressors are used to provide flexibility to the system with respect to pressure levels and yet enable the compressors to be run at a constant speed. Preferably, the compressors in the aggregate provide a total of at least 100 p.s.i. of compressed air. While in the preferred embodiment compressed air is used, other fluids may be used, such as combustible gas or liquid, or a particulate material entrained in the fluid.

As shown in FIG. 2, the tubes 30 extend through an annular rear wall 60 of the cowling 28. The rear wall 60 includes a plurality of openings 62 through which the tubes 30 pass. The rear wall 60 provides a supporting function for the tubes 30, as well as providing a connecting seal between the cowling 28 and the sludge conduit 16 to which it is attached by weldments.

As shown in FIGS. 2 and 3, the attrition segment 20 includes an arcuate tray 66 which angles upwardly within the cowling 28 and is attached to the lower tube elements 34 by hooks 68.

The operation of the sludge injection apparatus is as follows. Sludge is dumped into the hopper 24 of the pump 14 which pumps it through conduit 16 to the attrition segment 20. As the sludge reaches the attrition segment 20, it is essentially in the form of a continuous, moving mass. As the sludge reaches the end of the attrition segment 20, it encounters jets of high pressure compressed air through the orifices 38 in the tubes 30. These jets of high pressure air act as knives to slice through the sludge mass and break it up into smaller pieces. In addition, the forwardly directed orifices 36' help to propel the sludge in a downstream direction toward the kiln 12. It should be noted that the attriting action of the jets of air from the tubes 30 upon the sludge is to be distinguished from the process of atomization. With atomization, the velocity of the material, as it passes through a restricted orifice, causes it to break up into smaller particles, rather than the action of fluid jets upon it.

The sludge remains in close contact with the tubes 30 since the tubes converge inwardly in a downstream direction. The sludge mass may force the tubes radially outward as it moves along the attrition segment 20, but the tubes remain in close contact with the sludge as the sludge mass diminishes in size.

As the sludge particles exit the attrition segment 20, they are entrained in the high-speed air mass moving along the air conduit 18 into the kiln 12. These particles are propelled into the kiln where they encounter the high temperatures within the interior and are burned while airborne. Incombustible solids, if any, contained within the moving mass of sludge are also entrained within this moving air mass and are projected into the kiln. However, these larger objects are not accelerated to the same speed and will tend to fall to the bottom of the kiln and will become part of the clinker product.

Some very heavy, incombustible, larger objects will not be entrained in the air exiting conduit 18. They are forced by the slow moving sludge stream out onto the tray 66. There, they are "washed" free of sludge by air from the nozzles 30. As various heavy objects accumulate on the tray 66, the sludge stream moving continuously through the attrition segment 20 pushes these objects off the end of the tray where they fall into the clinker. It is anticipated that these particles, along with clinker and other incombustibles, will be conveyed to a ball mill (not shown in the drawings) which will grind the clinker material and concomitantly reduce these masses to smaller size.

It is preferable to operate the system 10 in a continuous mode so that chunks of sludge are continuously broken up into smaller particles and entrained within the moving air mass of the air conduit 1. However, it is within the scope of this invention to operate the system in a batch mode in which discrete quantities of sludge are conveyed sequentially through the attrition segment 20.

The components of the sludge injection system 10 generally are made from steel, although the tubes 30 preferably are made of a wear-resistant material which is also corrosion-resistant, such as 250 MA stainless steel.

While the form of apparatus herein described constitutes a preferred embodiment of this invention, it is to be understood that the invention is not limited to this precise form of apparatus, and that changes may be made therein without departing from the scope of the invention.

What is claimed is

1. An apparatus for attriting sludge into smaller particles to promote burning thereof, and for injecting said particles into a kiln to be burned, the apparatus comprising:
    conduit means for connecting a source of sludge with a kiln, said conduit means including an attrition segment adjacent to said kiln;
    means for conveying sludge from said source, along said conduit, through said attrition segment and into said kiln; and
    means for injecting a fluid into said attrition segment under pressure sufficient to attrite sludge therein to smaller particles as said sludge therein enters said kiln to promote burning of said sludge within said kiln, enhance flame shape of said sludge and to separate relatively large, incombustible particles from said smaller sludge particles, said fluid injecting means including a perforated member having orifices along a length thereof and tapering in diameter along said length such that said orifices direct said fluid upon said sludge therein and remain in close proximity to said sludge therein as said sludge flows along said members and reduces in diameter.

2. The apparatus of claim 1 wherein said fluid includes entrained particulate material.

3. The apparatus of claim 1 wherein said fluid is air.

4. The apparatus of claim 1 wherein said perforated member comprises a plurality of tubes extending along said attrition segment and having perforations therealong for introducing said fluid under pressure to said segment at discrete, concentrated locations.

5. The apparatus of claim 4 wherein said tubes are spaced about an inner periphery of said attrition segment.

6. The apparatus of claim 4 wherein said tubes are serpentine in shape along their lengths.

7. The apparatus of claim 4 wherein said perforations direct fluid substantially inwardly and forwardly toward said kiln within said attrition segment.

8. The apparatus of claim 4 wherein said tubes are attached at bases thereof to said attrition segment and are cantilevered along said segment such that as sludge progresses along said segment, said tubes are deflected radically outwardly by said sludge and intimate contact between said tubes and said sludge in said segment is effected.

9. The apparatus of claim 5 wherein said tubes are spaced apart sufficiently to allow particles entrained in the air stream to pass.

10. The apparatus of claim 4 further comprising tray means for supporting sludge within said segment.

11. The apparatus of claim 10 wherein lowers ones of said tubes extend along and are shorter in length than said tray such that larger, incombustible particles of said sludge collect upon said tray and fall downwardly therefrom into output of said kiln.

12. The apparatus of claim 10 wherein said tray means is supported on lower ones of said tubes.

13. The apparatus of claim 1 further comprising outer conduit means, surrounding said attrition segment, for injecting combustion air into said kiln to promote burning of sludge particles and to project sludge particles along said kiln.

14. The apparatus of claim 13 wherein said outer conduit means is concentric with said attrition segment.

15. An apparatus for attriting sludge into smaller particles to promote burning thereof, and for injecting said particles into a kiln, the apparatus comprising:
    conduit means for connecting a source of sludge with a kiln, said conduit means including an attrition segment adjacent to said kiln;
    said attrition segment including an imperforate cowling and a perforated member within said cowling;
    an outer conduit extending about an outer periphery of said attrition segment to form an air passageway with said cowling opening downstream of said attrition segment;
    means for conveying sludge from said source, along said conduit, through said attrition segment and into said kiln;
    means for supplying a fluid through said perforated member under relatively high pressure sufficient to attrite sludge in said attrition segment to smaller particles as said sludge enters said kiln to promote burning of said sludge within said kiln; and
    means for supplying combustion air through said outer conduit at a relatively low pressure to exhaust into said kiln, whereby sludge particles are burned more evenly and a flame shape of said burning sludge particles is enhanced.

* * * * *